United States Patent
Nakhla et al.

(10) Patent No.: US 7,436,818 B2
(45) Date of Patent: Oct. 14, 2008

(54) PACKET SWITCHED NETWORK VOICE COMMUNICATION

(75) Inventors: Ihab Nakhla, Sylvania (AU); Brett Andrew Avery, Satur Via Scone (AU); Eldon Chun-Keung Wong, Eastwood (AU)

(73) Assignee: Telstra Corporation Limited, Victoria (AU)

( * ) Notice: Subject to any disclaimer, the term of this patent is extended or adjusted under 35 U.S.C. 154(b) by 505 days.

(21) Appl. No.: 10/472,366

(22) PCT Filed: Mar. 15, 2002

(86) PCT No.: PCT/AU02/00300

§ 371 (c)(1), (2), (4) Date: Mar. 25, 2004

(87) PCT Pub. No.: WO02/076021

PCT Pub. Date: Sep. 26, 2002

(65) Prior Publication Data

US 2004/0153320 A1    Aug. 5, 2004

(51) Int. Cl.
*H04L 12/66* (2006.01)
*H04M 11/00* (2006.01)

(52) U.S. Cl. .................. 370/352; 370/353; 370/354; 379/265.12

(58) Field of Classification Search ............ 370/352, 370/353, 354, 355, 356; 379/265.12, 265.13, 379/90.01, 26.01, 27.06
See application file for complete search history.

(56) References Cited

U.S. PATENT DOCUMENTS 5,764,512 A    6/1998    Michel et al.
5,929,897 A *  7/1999   Schneider et al. ........ 348/14.08
6,097,804 A    8/2000    Gilbert et al.

(Continued)

FOREIGN PATENT DOCUMENTS

DE    2506771 A1    8/1976

(Continued)

OTHER PUBLICATIONS

Mohan et al., "A Strategy for Voice Browsing in 3G Wireless Networks", EUROCON 2001, International Conference on Trends in Communications, Technical Program, 1:120-123.

(Continued)

*Primary Examiner*—Melur Ramakrishnaiah
(74) *Attorney, Agent, or Firm*—Dorsey & Whitney LLP (57) ABSTRACT

Method of confirming the establishment of a voice connection, such as a VoIP connection, between first and second end stations coupled to a packet switched communications network. The voice connection is used to transfer an audible request from the first end station to the second end station, to ask the user of the second end station to generate a predetermined vocal response. The first end station compares any response from the second end station to the predetermined vocal response. The connection is determined to be established in response to a successful comparison. The predetermined vocal response includes a predetermined speech sequence comprising characters, a word or words, and a speech recognition procedure is applied to the received response to determine the presence of any speech sequence for comparison with the predetermined sequence. If a fault is detected an alternative connection is established to execute a process to correct the fault.

34 Claims, 4 Drawing Sheets

U.S. PATENT DOCUMENTS

| | | | |
|---|---|---|---|
| 6,282,192 B1 * | 8/2001 | Murphy et al. | 370/352 |
| 6,314,177 B1 * | 11/2001 | Davis et al. | 379/265.12 |
| 6,337,899 B1 | 1/2002 | Alcendor et al. | |
| 6,353,852 B1 | 3/2002 | Nestoriak, III et al. | |
| 6,493,437 B1 * | 12/2002 | Olshansky | 379/114.13 |
| 6,763,020 B1 * | 7/2004 | Hon | 370/356 |
| 7,136,458 B1 * | 11/2006 | Zellner et al. | 379/88.02 |
| 2001/0014861 A1 | 8/2001 | Oh | |

FOREIGN PATENT DOCUMENTS

| | | | |
|---|---|---|---|
| JP | 361157053 A | * | 7/1986 |
| JP | 401016196 A | * | 1/1989 |
| JP | 402310710 A | * | 12/1990 |
| JP | 10301595 | | 11/1998 |
| JP | 11008696 | | 1/1999 |
| JP | 2000049951 A | * | 2/2000 |
| WO | WO 99/67940 A1 | | 12/1999 |

OTHER PUBLICATIONS

Poppe et al., "Choosing the UMTS Air Interface Parameters, the Voice Packet Size and the Dejittering Delay for a Voice-over-IP Call between a UMTS and a PSTN Party", EIII INFOCOM 2001, The Conference on Computer Communications, Apr. 2001, 1:805-814.

* cited by examiner

PACKET SWITCHED NETWORK VOICE COMMUNICATION

The present invention relates to a method of confirming the establishment of communication via a voice type connection between first and second end stations coupled to a packet switched communications network. In particular, the present invention provides a method of allowing a call centre to automatically arrange for a VoIP connection to have a certain standard before the call using the connection is passed on to a call centre operative.

Internet Protocol (IP) based communications have the potential to allow the convergence of voice, video and data communications. One of the dominant factors preventing the widespread deployment/acceptance of such IP based services is quality. Two of the principal quality concerns are echo and voice breakup due to IP packet loss.

Echo is caused by two types of effect, namely line echo and acoustic echo. Line echo is caused by factors in the transmission media, whereas acoustic echo is caused by the acoustic room reflections which result from the use of a standard multimedia set up consisting of a pair of speakers and microphone. Headsets do not cause acoustic echo as there is no acoustic path between the headset's earphone speakers and its microphone.

In traditional voice communications networks (e.g. the Public Switched Telephone Network-PSTN) echo (line echo and, to a certain extent, acoustic echo) were managed by solutions that were fixed in location; and were at the core of the network (i.e. away from the communicating parties and within the network domain).

With IP based networks echo management within the network is not always feasible. This is due to echo delay jitter to which some echo control processes are intolerant. Thus if effective echo management is to be achieved in IP based communications some other method of echo management is required.

Voice break up due to IP packet loss is exclusive to packet based communications (circuit switched networks like the PSTN do not have this defect). To manage this problem it must first be detected, although, once detected, means to eliminate it or minimise it to acceptable levels need to exist. However this problem can be fully manifest at the user end of the communication path, and then 'network domain' solutions are unable to determine the full extent of the problem which accordingly prevents the implementation of a solution.

The closest equivalent problem to occur in circuit switched networks is a reduction in the signal quality. However, in this case, the problem is overcome for example by turning up the line volume. A solution using this approach was described in the Japanese Patent Publication 10-301595 "A Voice Recognition/Response Device" to NEC. In this document, a voice recognition system is used to attempt to recognise voices spoken in a telephone line. If the voice recognition system is unable to determine the words used, then it is assumed that the signal to noise ratio on the line is too poor and accordingly, the line volume is adjusted to provide a better signal. However, as there is no equivalent to a signal to noise problem that can be overcome by adjusting the signal volume, then this is not applicable to packet switched networks In addition to this, further problems may arise due to problems with an end user's computer hardware or software. This may occur for example if the VoIP applications software required for the call, such as "Net Meeting", has not been installed correctly. Alternatively software or hardware problems may be caused by viruses, or by inexperienced computer users not having their computer configured correctly. Thus, for example, it may be that the user attempts to conduct a VoIP call without having a sound card installed, or without having the microphone or speakers correctly plugged in to the computer system. Accordingly, in these circumstances, the user of the computer would believe that the VoIP connection is not functioning correctly even though the connection has been correctly established.

Accordingly, when a VoIP call is being made, it is possible that one of the parties involved in the call believes that a connection has not been established due to their inability to correctly configure the computer for operation.

In accordance with the present invention there is provided a method of confirming the establishment of communication via a voice type connection between first and second end stations coupled to packet switched communications network, the method including:

using the voice type connection to transfer an audible request from the first end station to the second end station, the audible request asking the user of the second end station to generate a predetermined vocal response;

causing the first end station to monitor for any response from the second end station;

comparing any received response to the predetermined vocal response; and determining that communication is established in response to a successful comparison.

In this regard, the term voice type connection refers to any connection which allows calls to be made which operate to transfer audio data and, additionally optionally video data.

Typically the predetermined vocal response includes a predetermined sequence of words wherein the method of comparing the received response and the predetermined vocal response includes the steps of applying a speech recognition procedure to the received response to determine the presence of any words in the response; and, comparing the words determined from the received response to the predetermined sequence of words. The speech recognition procedure can be used to determine whether the received response is suitably similar to the predetermined vocal response, although alternatively, this check may be performed manually.

The voice type connection is usually a VoIP connection established by the first end station with the connection being established utilising an IP telephony protocol, although the voice type connection could be established by either end station using an appropriate protocol. Typically the first end station is part of a call centre and the connection is established in response to a request made by the second end station for communication with the call centre. However, alternatively the second end station may be the terminal of a call centre operative, with the first end station operating to check the operatives terminal set-up.

The audible request typically comprises a pre-recorded set of vocal instructions. However, the audible request could direct the user of the second end station to access a web page an e-mail, or the like which includes instructions for generating the predetermined vocal response. Thus, the predetermined vocal response is typically a set phrase, with the user being asked to say the phrase over the voice type connection.

Typically the method of correcting a fault includes causing first end station to communicate with the second end station via alternative connection; determining the faults with the VoIP connection; and correcting the faults.

Thus, for example, the alternative connection may include e-mails, instant messaging, SMS messaging, a separate WAP (wireless applications protocol) connection, or a web connection. However this list is not exhaustive and any suitable connection can be used.

Typically the method of determining the fault includes transferring a predetermined set of questions to the second end station via the alternative connection, and monitoring responses received via the alternative connection from the user of the second end station.

The method of correcting the faults may include sending a number of predetermined instructions to the user of the second end station, via the alternative communications link, the predetermined set of instructions being selected in accordance will the responses received via the alternative connections. As an alternative however the method of correcting a fault can include transferring software to the second end station via the alternative connection.

If an end station is operating to confirm the establishment of communication via a voice type connection, this is usually achieved by having the processor transfer an audible request to the second end station and then monitor for any response received from the second end station, monitor for any received responses and compare any received response to a predetermined vocal response to determine whether the connection is successfully established.

The audible response is typically stored in a store together with any of the sets of questions which may be transferred to the second station via an alternative connection, as described in more detail above.

The present invention also provides, a method of operating a call centre to receive communications using voice type connection between the call centre and an end station, the method including causing the call centre to establish a voice type connection between call centre and the end station in accordance with the method of the first broad form of the present invention.

In this case, the techniques can be used to asses the voice type connection both of incoming calls and of the call centre operatives. This can be achieved by ensuring that incoming calls and call centre operatives initially connect with the first end station to allow the communication ability to be checked.

Preferred embodiments of the present invention are hereinafter described, by way of example only, with reference to the accompanying drawings, in which.

Figure 1:
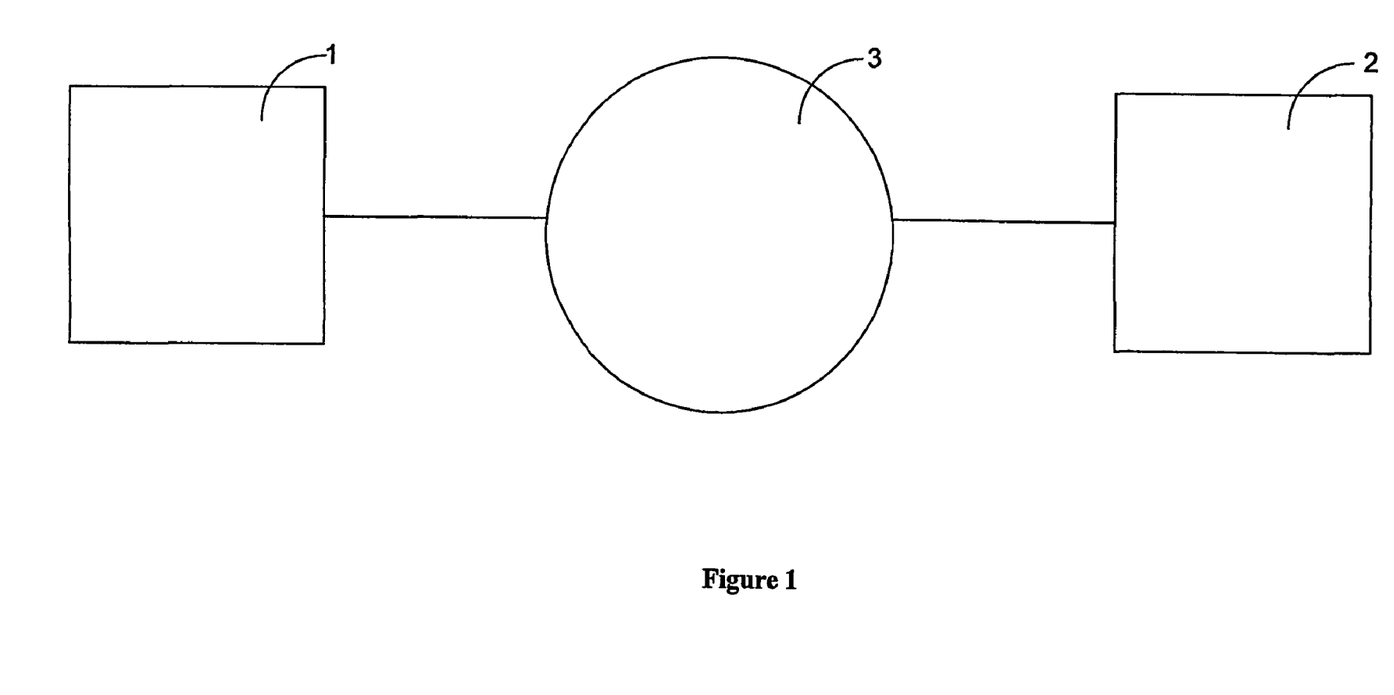
FIG. 1 is a schematic diagram of a first example of a communication system according to the present invention.

FIG. 1 shows a basic communication system formed from two end stations 1,2 coupled together via a communications network, such as the Internet 3. Although this example is specific with respect to VoIP calls made via the Internet, the current techniques can be directed to any voice type call which is made over a packet switched communications network between two end points. In this regard, the term voice type call is any call which operates to transfer audio data and, additionally optionally video data. Accordingly, this system could be used with any packet switched communications network, such as an Ethernet LAN, or the like.

Figure 2:
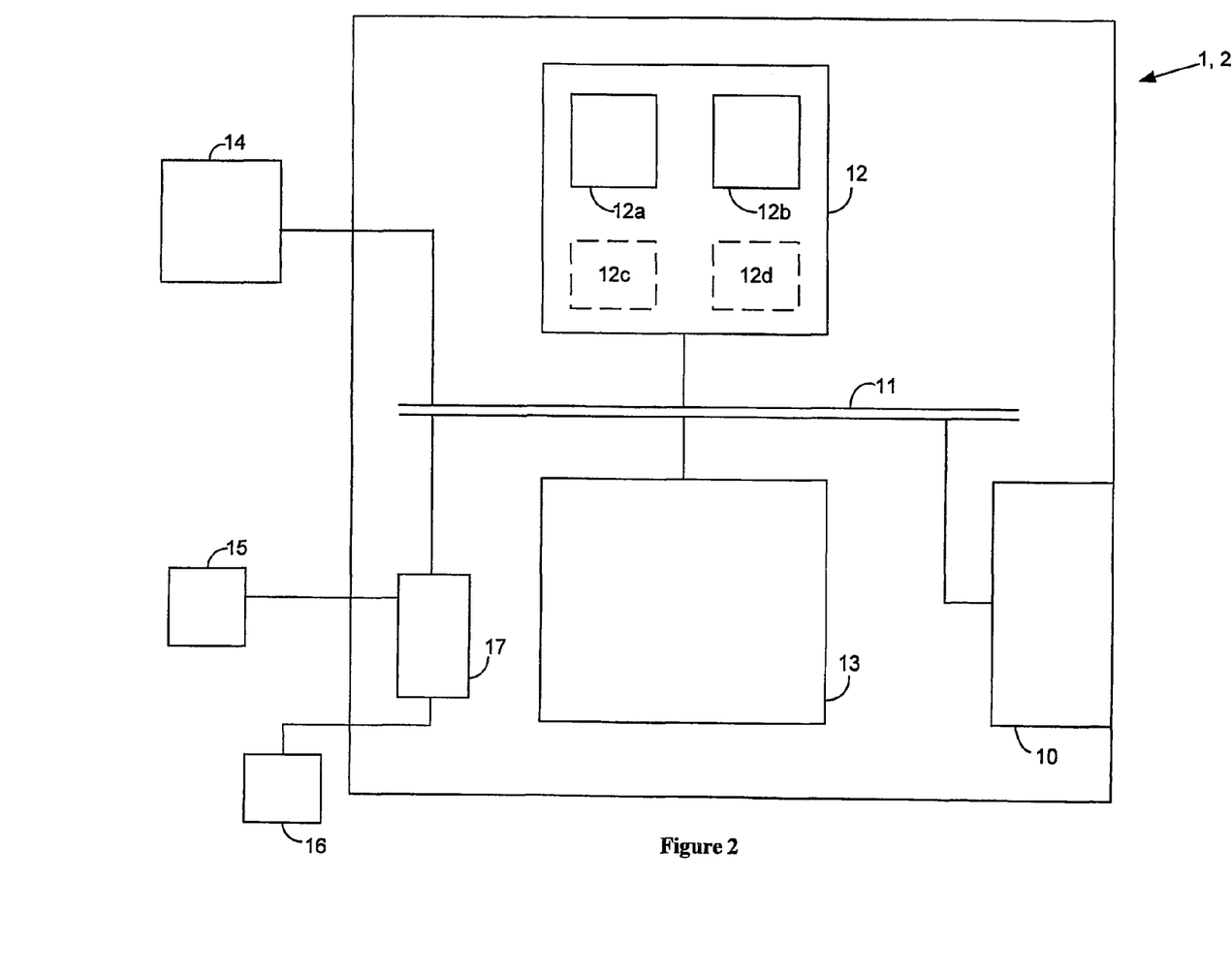
FIG. 2 is a schematic diagram of one of the end stations of FIG. 1.

The end stations 1, 2 are shown in more detail in FIG. 2. As shown, each end station includes an interface 10 for coupling the end station to the Internet 3. The interface 10 is coupled to a processor 12 and memory 13, via a bus 11. Also coupled to the bus 11 is an input/output device (I/O device) 14. Accordingly, it will be appreciated by a skilled person that the end stations typically are formed from computing devices adapted to use the Internet, such as personal computers, laptops, or palmtops having a suitable modem or interface 10, as well as, Internet ready televisions, or the like. From this it will be appreciated that the I/O device 14 typically includes a keyboard, and a monitor.

In order to allow VoIP communication to be performed, speakers 15 and a microphone system 16 are also provided which are coupled to the bus 11 using a sound card 17, as shown. In order to provide for a VoIP connection, the processor 12 will execute applications software 12*a*, such as Net Meeting™ which is capable of configuring the processor 12 to provide VoIP communication. This will usually therefore be achieved by implementing one of the telephony signal protocols, such as H.323 or SIP (Session Initiation Protocol).

In addition to this, the processor 12 is also capable of executing applications software 12*b*, allowing the end stations 1, 2 to communicate via the Internet in another manner. Accordingly the applications 12*b* will typically comprise of a web browser, e-mail system, or the like.

In this example, it is assumed that the end station 1 is to initiate the call as well as to carry out the confirmation of establishment of communication. In order to be able to achieve this, the processor 12 of the end station 1 also implements voice recognition applications software 12*c* and quality checking applications software 12*d*, as shown.

In order to initiate communication the end station 1 will generate a data packet in accordance with a respective telephony protocol. This data packet, which is transferred over the Internet 3 to the end station 2, will request the establishment of a VoIP connection in accordance with a predetermined quality of service. If the end station 2 is capable of accepting such a connection, it will generate an acceptance packet which is transferred back via the Internet 3, to the end station 1. Upon receipt of the acceptance packet, the end station 1 can begin transmitting data packets along the VoIP connection.

This is the standard procedure for establishing VoIP connections, as will be appreciated by a person skilled in the art. Accordingly, the first stage is for the end station 1 to determine whether the end station 2 is aware that a connection has been established. This process may be performed under the supervision of a user of the end station 1.

In order to determine whether the user of the end station 2 appreciates that the connection has been established, the end station 1 will generate an audible request which is transferred to the end station 2 via the VoIP connection. The audible request will typically ask the user of the end station 2 to speak a predetermined word or phrase into their microphone so that this can be detected by the end station 1 to confirm that the communication is successfully established.

As an alternative however the audible request may be selected so that a different vocal response is generated each time by the user of the end station 2. Thus, for example, the predetermined response that is required to be spoken by the user of the end station 2 may be the date, or the answer to different questions. As a further alternative, the predetermined response could be a password or the like, allowing the system to incorporate a security check, such as a network logon.

This audible request could be spoken directly by the user of the end station 1, although it will usually be generated automatically from one of a number of audible requests stored in the memory 13. Once this has been done, the audible request will be transferred to the end station 2 and played back to the user of the end station 2 through the speakers 15.

Assuming that communication is correctly established, then the user of the end station 2 will hear the audible request and speak back the predetermined words or phrase into the microphone 16. Thus, the user will speak the requested phrase, indicate the date, vocalise a password, or the like. This will be transferred back via the Internet 3 to the end station 1 and be detected by the processor 12.

If the system is in automatic operation, then the processor 12 operates to receive the vocal response input by the user of the end station 2 and performs a speech recognition process on this received vocal response using the speech recognition software 12c. The aim of this is to determine exactly what the user of the end station 2 has said. It will be appreciated that this comparison check may alternatively be performed manually by a user of the end station 1.

If the words spoken by the user of the end station 2 can be discerned using the speech recognition technique then these are compared to the words or phrase referred to in the audible request. If the words or phrases match, this indicates that suitable communication has been established, whereas if the words or phrases do not match, or if no response is received, this indicates that there is a problem with the established link.

Accordingly, in this case, it is necessary for the end station 1 to communicate with the end station 2 in an alternative manner. In order to do this, the end station 1 will communicate with the end station 2 via an alternative connection, such as via the sending of a web page to the users browser, via an e-mail, via an SMS message, or the like.

It will be realised that whilst this additional connection is preferably made via the Internet 3, this is not essential as long as information can be transferred to the user of the end station 2. Thus, the connection may alternatively be made using a telephone call, via the PSTN.

In the present example, the end station 1 returns a web page which is transferred to the end station 2 indicating that the vocal response was not correctly received. In addition to this, the web page will typically include further instructions concerning how the user of the end station 2 can continue to proceed so that the system can be configured correctly.

Thus, if no response is received by the end station 1, this indicates that there is a fault with the initial connection or there is a fault with the configuration at the end station 2. This may have occurred for example if the speakers 15 or the microphone 16 were not correctly connected to the end station 2, or for example if the speaker volume was turned down.

Accordingly in this case, the web page will ask the user of the end station 2 to indicate whether the original audible request was heard, and if so whether any attempt was made to provide the predetermined vocal response which is required.

If the user of the end station 2 indicates that no request was heard then the end station 1 will utilise this information to access a knowledge base (KB) or expert system stored in the memory 13. The KB will indicate for every particular eventuality or at least every possible answer to all the questions, the action that can be taken to improve the communication situation.

Thus, for example, if the user of the end station 2 is unable to hear the audible request, then the processor 12 of the end station 1 will access the KB and transfer a set of instructions to the end station 2 asking the user to check that the speakers are correctly connected and that the volume is turned up. If this is unsuccessful, the end station 1 may determine that the connection was not correctly established and operate to establish a new connection. The process will then be repeated with the new connection in place.

Alternatively, if the user of the end station 2 heard the audible request and attempted to generate predetermined vocal response which was not received, the KB will provide a set of instructions asking the user of the end station 2 to check that the microphone is correctly installed.

In the situation in which the end station 1 receives a vocal response from the end station 2 but the words or predetermined phrase cannot be distinguished by the voice recognition applications software 12c, then this indicates to the processor 12 of the end station 1 that the quality of the communication is too poor to be of use. This will typically be caused by a large amount of acoustic echo at the site of end station 2, or by a large amount of packet drop outs.

In order to overcome this, the quality checking applications software 12d of the end station 1 may access a software agent stored in the memory 13 and transfer this via the Internet 3 to the end station 2. The software agent would automatically operate to adjust the speaker and microphone volumes in the end station 2 to try and reduce the level of acoustic echo. Alternatively instructions may be sent to the end station 2 which instruct the user to make appropriate changes to the volume levels.

Alternative solutions that may be required are the provision of new applications software (possibly as upgrades) that is required for the VoIP connection to function correctly, new software for the system in general, such as new driver software or new DLL files, as well as software to overcome the problems of data packet loss.

An alternative solution, especially with respect to acoustic echo, is to have the user of the end station 2 switch to half-duplex mode of operation. In this mode sound is only transferred over the connection in one direction at a time, thereby ensuring that sound is not emitted from the speakers when the microphone is in use, thereby preventing the occurrence of acoustic echo.

As would be appreciated by a person skilled in the art, it may take several iterations of questions and instructions before the problems are fully overcome.

In the event in which the problems could not be overcome, an indication of this is transferred from the end station 1 to the end station 2 via the alternative connection. Thus, for example, a web-page may be returned to the end station 2 indicating that as the problem could not be overcome, then the connection will be dropped and subsequent communication must then be achieved in a different manner, such as by phone.

The above described techniques may be applied to the situation of a call centre, or the like. In this case, the end station 1 could act as part of the call centre with the end station 2 being a person making an enquiry of the call centre. The call centre may for example form part of the contact centre management system described in the specification of the Applicant's International Patent Application No. PCT/AU02/00021.

In this case, the person at the end station 2 may be, for example, browsing web pages or the like which include a link to the call centre. In this circumstance, if the user of the end station 2 selects the link to the call centre this will cause a request to be sent to the call centre end station 1 requesting a VoIP connection.

Upon receiving the request, the end station 1 at the call centre will operate to initiate a link with the end station 2 and then perform a check of the voice quality achieved over this link. This will be done automatically before the user at the end station 2 talks to a call centre operative.

Accordingly, in this example, the end station 1 will automatically generate the audible request which will be transferred to the end station 2. The end station 1 will then operate to automatically configure the connection so that a suitable call quality is achieved, in the manner described above.

Once suitable call quality has been achieved, the call will be transferred to a call queue to be answered by one of the call centre operatives in turn. Checking that the line quality is acceptable before the call is transferred to the call queue ensures that time is not wasted by the call centre operatives in instructing the user of end station 2 to configure their line correctly, with this already being done before the call is queued.

It will be appreciated from the above that the end station 1 need not be necessarily be involved in communication itself. Accordingly, the call centre operative may be located on a different end station (not shown) so that a separate system can be used to check the quality of the VoIP connections between separate end stations.

Figure 3:
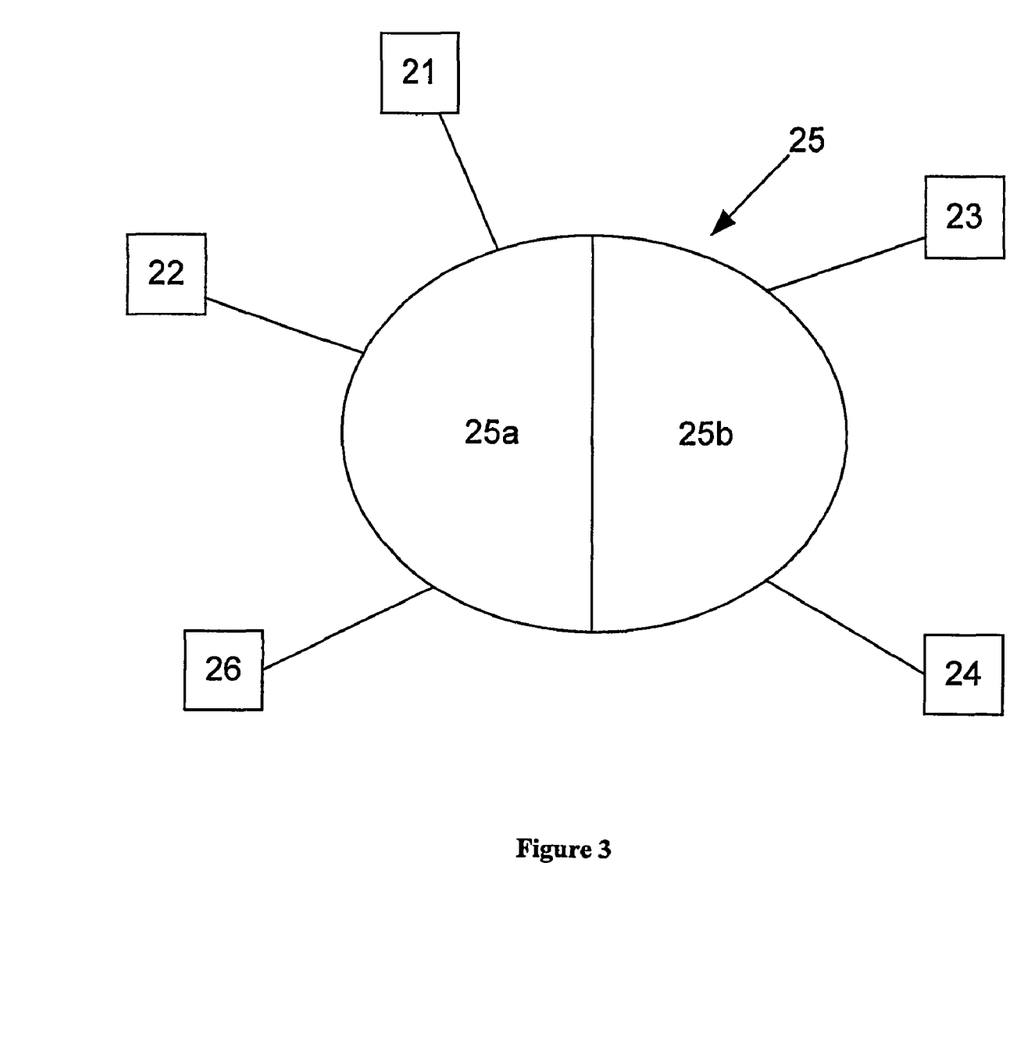
FIG. 3 is a schematic diagram of a second example of a communication system according to the invention; and, FIG. 4 is a schematic diagram of the checking system of FIG. 3.

An example of this is shown in FIG. 3, which shows a number of end stations, 21, 22, 23, 24 coupled to an IP Network shown generally at 25. The IP network includes a call centre network 25*a* which together with the end stations 21,22 and a check system 26 forms part of the call centre. The call centre network 25*a* is coupled to a more general network, such as the Internet 25*b*. This configuration is used to allow remote third parties to contact the call centre via the Internet 25*b*.

In use, if a call is to be made between, for example, the end stations 21, 23, then one of the end stations 21,23 will initiate the connection with the other end station 21,23 in the normal way. At this stage, the attempt to initiate a connection will be detected by the check system 26.

Before the connection is established, a connection will first be established between each of the end stations, 21, 23 and the check system 26. The check system 26 will then operate to check the quality of the established VoIP communication in accordance with the techniques outlined above. Once the check system 26 has determined that each of the end stations 21, 23 is capable of performing VoIP connection up to a predetermined quality, the check system 26 will then interconnect the end stations 21, 23 allowing VoIP communication to be performed.

In the example of the call centre mentioned above, the end stations 21, 22 therefore represent end stations used by the call centre operatives, with the end station 23 representing the end station of a user making an enquiry to the call centre.

In this case, before any calls are taken by the operatives of the end stations 21, 22, the check system 26 will operate to check that the end stations 21, 22 are configured correctly. In order to do this, when an operative user of one of the end stations 21, 22 initially logs on to the call centre system, they will enter a user name and password.

At this point, the check server 26 will be notified that the end station 21, 22 is logging on to the network. Accordingly, the check system 26 operates to generate an audible request which is transferred to the end station 21, 22, as required. The above described procedure of having the operative of the end station vocalise a predetermined phrase, or the like, will then be performed in order to check the operation of the end station 21, 22. Thus, the technique will be as described above with the check system 26 replacing the end station 1 and the end station 21,22 replacing the end station 2.

Once this has been performed the operatives of the end stations 21,22 may operate to take calls.

In this situation, when the user of the end station 23 requests help from the call centre, the user of the end station 23 will automatically be coupled to the call centre network 25*a* via the Internet 25*b*.

Once this has been achieved, the check system 26 will operate to generate an audible request which is then transferred to the end station 23, to allow the quality of the VoIP communication with the end station 23 to be checked.

Figure 4:
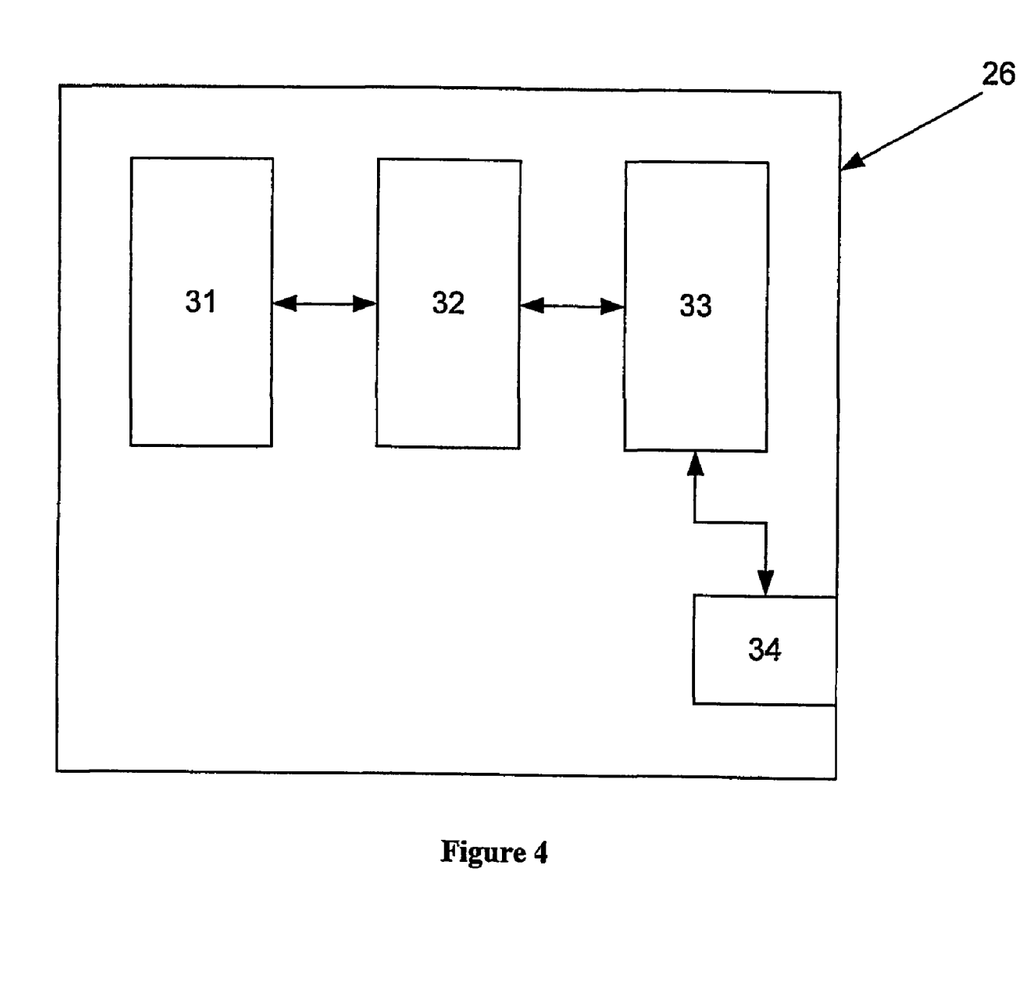

An example of a check system 26 suitable for performing this operation is shown in FIG. 4.

As shown, the check system 26 includes a quality checking module 31, a voice recognition module 32, and an VoIP call handling stack module 33 which are coupled to a network card 34 as shown. The network card 34 couples the checking system 26 to the call centre network 25*a*.

In use, when an end station 21,22,23,24 makes a call, or logs on to the call centre network 25*a*, the connection request is transferred to the VoIP call handling stack module 31 which operates to generate and transfer an audible request back to the end station via the network 25. The check system 26 will then function in a similar manner to the end station 1 as described above.

Thus the voice recognition module 32 will perform the function of the voice recognition applications software 12*c* in the first example, with the quality checking module 31 performing the function of the quality checking applications software 12*d*.

Accordingly, the voice recognition module 32 will operate to receive any response generated by the end station 21,22, 23,24 and attempt to recognise the response. If the response cannot be recognised, the quality checking module 31 will operate to cause the check system 26 to communicate with the end station in an alternative manner to attempt to improve the quality of the connection.

As the check system 26 forms part of a call centre, it will be typical for the check system 26 to have to deal with a number of incoming calls simultaneously. In order to do this, the check system may in fact be provided with multiple ones of each modules 31,32,33.

Thus, for example, the system may include five VoIP call handling stack modules 33, ten voice recognition modules 32 and two decision modules 31. This would allow a single check system 26 to check the VoIP communication quality for a number of different connections simultaneously.

It will be appreciated that the modules may be implemented as part as a single server. Alternatively, however separate servers may be provided for each module, or at least each type of module. In this case, the check system would be made from a number of interconnected servers.

Furthermore, whilst the above example has been described with respect to a call centre, it will be appreciated that the check system 26 may be incorporated into any network. Thus, for example, the network 25 could comprise the Internet, with the check system being used to check the quality of calls made between subscribers to a quality control system. Thus the quality control system may be provided for example to allow conference calls to be performed. In this case, as each end station 21,22,23,24 attempts to join the conference call, the check system 26 will check the quality of the VoIP communication thereby ensuring that the end station can join the conference call without destroying the sound quality of the call.

It will be appreciated by persons skilled in the art that numerous variations and modifications will become apparent. All such variations and modifications which become apparent to persons skilled in the art, should be considered to fall within the spirit and scope of the invention as broadly herein described.

The invention claimed is:

1. A method of confirming the establishment of communication via a voice type connection between first and second end stations coupled to a packet switched communications network, the method including:
   a) using the voice type connection to transfer an audible request from the first end station to the second end station, the audible request asking the user of the second end station to generate a predetermined vocal response;

b) causing the first end station to monitor for any response received from the second end station;

c) comparing any received response to the predetermined vocal response to provide a successful comparison or an unsuccessful comparison;

d) determining the voice type connection to be established in response to a successful comparison; and e) determining a problem with the voice type connection in response to an unsuccessful comparison.

2. A method according to claim 1, wherein the predetermined vocal response includes a predetermined speech sequence comprising characters, a word or words, and wherein the method of comparing the received response and the predetermined vocal response includes the steps of:

i) applying a speech recognition procedure to the received response to determine the presence of any speech sequence in the response; and ii) comparing the speech sequence determined from the received response to the predetermined sequence.

3. A method according to claim 1 wherein the voice type connection is established by the first end station, the voice type connection being established utilizing an IP telephony protocol.

4. A method according to claim 1, wherein the audible request comprises a prerecorded set of vocal instructions.

5. A method according to claim 1 wherein the voice type connection is a VoIP connection, and wherein the packet switched communications network includes the Internet.

6. A method according to claim 1, further including correcting any fault in the voice type connection in response to determining the problem.

7. A method according to claim 6, wherein the method of correcting the fault includes:

i) causing the first end station to communicate with the second end station via an alternative connection;

ii) determining the fault with the voice type connection; and iii) correcting the fault.

8. A method according to claim 7, wherein the alternative connection includes at least one of e-mail, instant messaging, SMS, a WAP connection, or a web connection.

9. A method according to claim 8, wherein the method of determining the fault includes transferring a predetermined set of questions to the second end station via the alternative connection, and monitoring the responses received via the alternative connection from the user of the second end station.

10. A method according to claim 8, wherein the method of correcting the fault includes sending a number of predetermined instructions to the user of the second end station via the alternative communications link, the predetermined set of instructions being selected in accordance with the responses received via the alternative connection.

11. A method according to claim 8, wherein the method of correcting the fault includes transferring software to the second end station via the alternative connection.

12. A method of operating a call center to receive communications using a voice type connection between the call center and an end station, the method including causing the call center to establish a voice type connection between the call center and the end station in accordance with the method of claim 6.

13. A method according to claim 12, wherein establishment of the voice type connection is initiated by the end station in accordance with an IP telephony protocol.

14. A method according to claim 13, wherein establishment of the voice type connection is initiated by the call center in response to a request received from the end station via an alternative connection.

15. A method of checking callers including confirming establishment of communication with a caller according to a method as claimed in claim 1 before queuing the caller in a queuing system.

16. A method of checking agents including confirming establishment of communication with an agent according to a method as claimed in claim 1 before the agent is considered available for handling calls received by a call center.

17. A method of checking callers including confirming establishment of communication with a caller according to a method as claimed in claim 1 before the caller joins a conference call.

18. A method according to claim 1, wherein the predetermined vocal response includes a predetermined speech sequence comprising characters, a word or words, and wherein the method of comparing the received response and the predetermined vocal response includes the steps of:

i) applying a speech recognition procedure to the received response to determine the presence of any speech sequence in the response; and ii) comparing the speech sequence determined from the received response to the predetermined sequence.

19. A method according to claim 1, wherein the audible request comprises a prerecorded set of vocal instructions.

20. A method according to claim 1, wherein the problem is a fault.

21. A method according to claim 1, wherein the problem is poor quality in the voice type connection.

22. A first end station adapted to confirm the establishment of communication via a voice type connection with a second end station, the first and second end stations being coupled to a packet switched communications network, the first end station including:

a) an interface for coupling the first end station to the communications network, the voice type connection being established via the interface;

b) a processor coupled to the interface, the processor being adapted to i) use the voice type connection to transfer an audible request from the first end station to the second end station, the audible request asking the user of the second end station to generate a predetermined vocal response;

ii) monitor for any response received from the second end station;

iii) compare any received response to the predetermined vocal response to provide a successful comparison or an unsuccessful comparison;

iv) determine the voice type connection to be established in response to a successful comparison; and v) determine a problem with the voice type connection in response to an unsuccessful comparison.

23. A first end station according to claim 22, wherein predetermined vocal response includes a predetermined speech sequence comprising characters, a word or words, and wherein the processor is further adapted to compare the received response and the predetermined vocal response by:

i) applying a speech recognition procedure to the received response to determine the presence of any speech sequence in the response; and ii) comparing the speech sequences determined from the received response to the predetermined speech sequence.

24. A first end station according to claim 22, wherein the first end station further includes a store coupled to the processor, the store being adapted to store the audible request in use, the audible request including a prerecorded set of vocal instructions.

25. A first end station according to claim 22, wherein the processor is adapted to establish the voice type connection in accordance with an IP telephony protocol.

26. A first end station according to claim 22,
wherein the processor is further adapted to correct any fault in the voice type connection in response to an unsuccessful comparison.

27. A first end station according to claim 26, wherein the processor is further adapted to:
   i) communicate with the second end station via an alternative connection;
   ii) determine the fault with the voice type connection; and
   iii) correct the fault.

28. A first end station according to claim 27, wherein the alternative connection comprises at least one of e-mail, instant messaging, SMS, a WAP connection, or a web connection.

29. A first end station according to claim 27, wherein the processor is adapted to determine the fault by:
   a) transferring a predetermined set of questions to the second end station via the alternative connection, the predetermined set of questions being stored in the store; and
   b) monitor the responses received via the alternative connection from the user of the second end station.

30. A first end station according to claim 29, wherein the processor is adapted to correct the fault by sending a number of predetermined instructions to the user of the second end station via the alternative communications link, the predetermined set of instructions being selected from a range of sets of instructions stored in the store in accordance with the responses received via the alternative connection.

31. A first end station according to claim 22, wherein predetermined vocal response includes a predetermined speech sequence comprising characters, a word or words, and wherein the processor is further adapted to compare the received response and the predetermined vocal response by:
   i) applying a speech recognition procedure to the received response to determine the presence of any speech sequence in the response; and
   ii) comparing the speech sequences determined from the received response to the predetermined speech sequence.

32. A first end station according to claim 22, wherein the first end station further includes a store coupled to the processor, the store being adapted to store the audible request in use, the audible request including a prerecorded set of vocal instructions.

33. A first end station according to claim 22, wherein the problem is a fault.

34. A first end station according to claim 22, wherein the problem is poor quality in the voice type connection.

* * * * *